Figure 1:
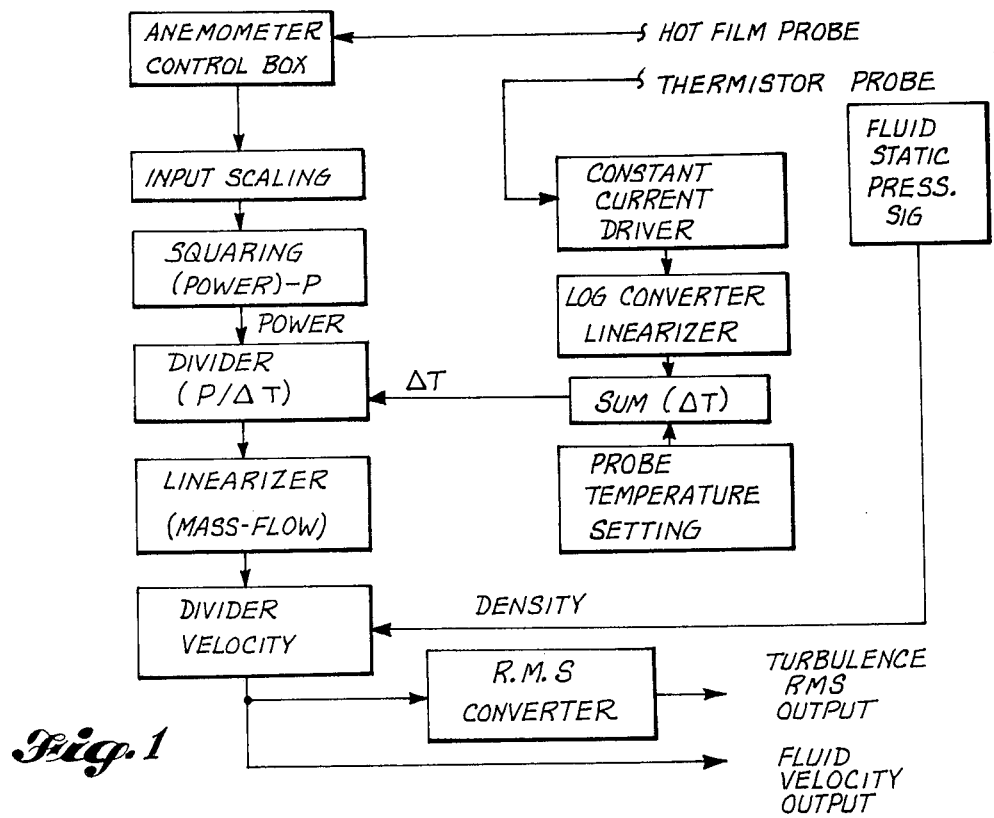

United States Patent [19]

Newell

[11] 4,122,722
[45] Oct. 31, 1978

[54] ANEMOMETER COMPENSATOR LINEARIZER

[75] Inventor: Stanley E. Newell, Seattle, Wash.

[73] Assignee: The Boeing Company, Seattle, Wash.

[21] Appl. No.: 783,361

[22] Filed: Mar. 31, 1977

Related U.S. Application Data

[62] Division of Ser. No. 727,508, Sep. 28, 1976, Pat. No. 4,070,908.

[51] Int. Cl.² .............................................. G01K 7/24
[52] U.S. Cl. ............................................... 73/362 AR
[58] Field of Search ...................... 73/362 AR, 170 R; 328/145

[56] References Cited

U.S. PATENT DOCUMENTS

| | | | |
|---|---|---|---|
| 3,710,089 | 1/1973 | Ohata et al. | 328/145 X |
| 3,750,155 | 7/1973 | Oman | 73/362 AR X |
| 3,754,442 | 8/1973 | Arnett | 73/362 AR |
| 3,781,693 | 12/1973 | Ford | 328/145 |
| 3,861,214 | 1/1975 | Siyahi | 73/362 AR |
| 3,906,391 | 9/1975 | Murdock | 73/362 AR X |
| 3,933,046 | 1/1976 | Ebrecht | 73/362 AR X |
| 3,973,147 | 8/1976 | Yu | 73/362 AR X |

Primary Examiner—James J. Gill
Attorney, Agent, or Firm—Conrad O. Gardner; B. A. Donahue

[57] ABSTRACT

Fluid flow velocity and turbulence are computed by processing bridge excitation voltage provided in hot wire or hot film anemometry. A system utilizing a log converter circuit provides an output signal which is substantially linear with fluid temperature and a probe temperature setting potentiometer provides a signal voltage representative of the difference between hot probe operating temperature and the fluid temperature.

1 Claim, 4 Drawing Figures

ANEMOMETER COMPENSATOR LINEARIZER

This is a division of application Ser. No. 727,508, filed Sept. 28, 1976, now U.S. Pat. No. 4,070,908.

The present invention relates to anemometer systems for determining fluid flow velocity and more particularly to means for processing the bridge excitation voltage output signal from anemometer control units utilizing King's Law.

Heretofore, fluid flow velocity measuring apparatus has been designed to compute flow velocity from the output of a thermistor bridge anemometer, e.g., as in U.S. Pat. No. 3,595,079 albeit to measure the velocity and direction of blood flow however utilized for low velocity measurements and thus not providing for fluid mass change corrections.

Further thermistor bridge fluid flow anemometer systems with associated linearizing circuits include U.S. Pat. No.'s 3,363,462 utilizes heat sensing elements, one for measurement and another for sensing fluid temperature changes, a technique involving compensating for temperature changes in fluid not correcting for mass changes, a system which is further basically a temperature compensated Wheatstone bridge and a linearized output while U.S. Pat. No. 3,438,253, though similar to anemometry techniques in utilizing linearized measurement of heat transfer as its basic parameter since directed to flow of blood not creative of fluid compressibility effects, does not compute velocity and pressure corrections.

Also prior attempts to provide fluid flow velocity and turbulence have included processing of the raw data either manually or by programming a digital computer to do so and may be contrasted with the present system for providing such information in real time.

It is accordingly an object of the present invention to provide means for linearizing and compensating the bridge excitation voltage output of a hot wire anemometer utilizing temperature sensor and fluid static pressure output signals.

It is yet another object of this invention to provide means for determining fluid velocity and turbulence on line in real time.

It is still another object of this invention to provide means for linearizing thermistor output utilizing log converter circuit means.

In accordance with a preferred embodiment of the system of the present invention, linearizer circuit means are coupled in the output circuit path of an anemometer control unit and temperature sensing and fluid static pressure sensing probes are utilized downstream of the anemometer control unit in the system to provide a density corrected system to provide a signal representative of instantaneous linearized fluid velocity. Divider circuit means are then utilized to provide the steady state velocity component thereof which steady state component is further applied to a true RMS converter yielding turbulence RMS values which when subsequently divided by the aforementioned steady state component provides a signal representative of turbulence intensity.

Other features and advantages of the present invention will become apparent from the following description, reference being made to the accompanying drawings wherein a method of signal processing and a preferred embodiment of the invention is illustrated.

In the drawings

Figure 2:
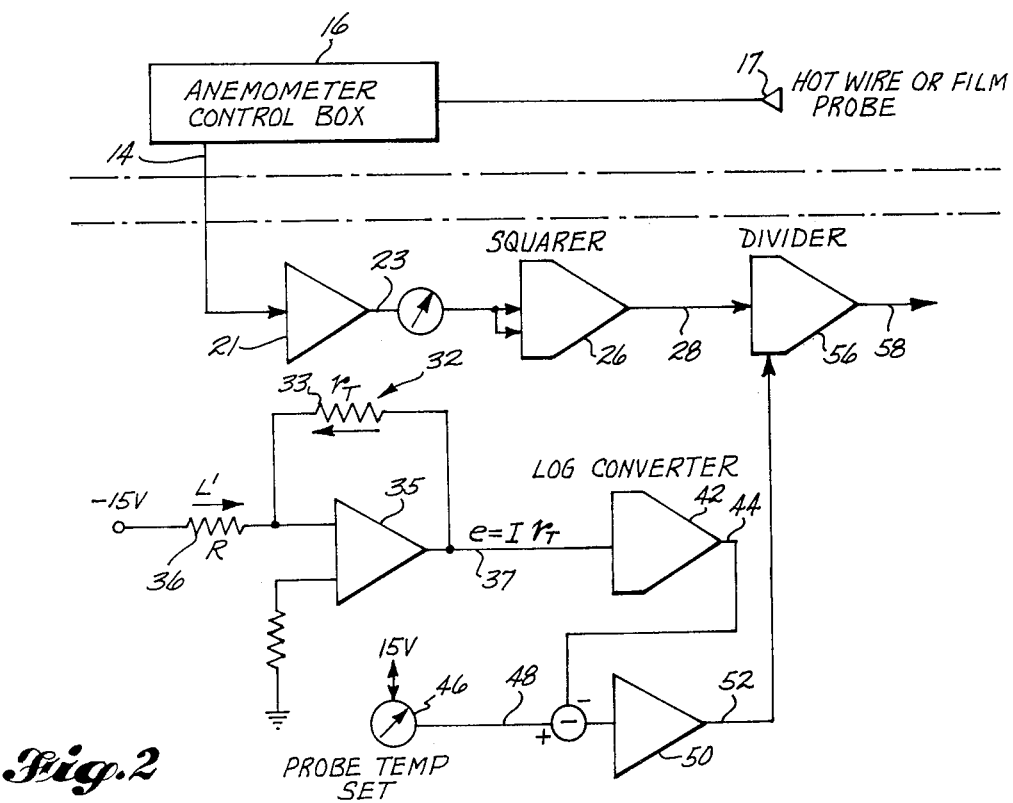
Figure 3:
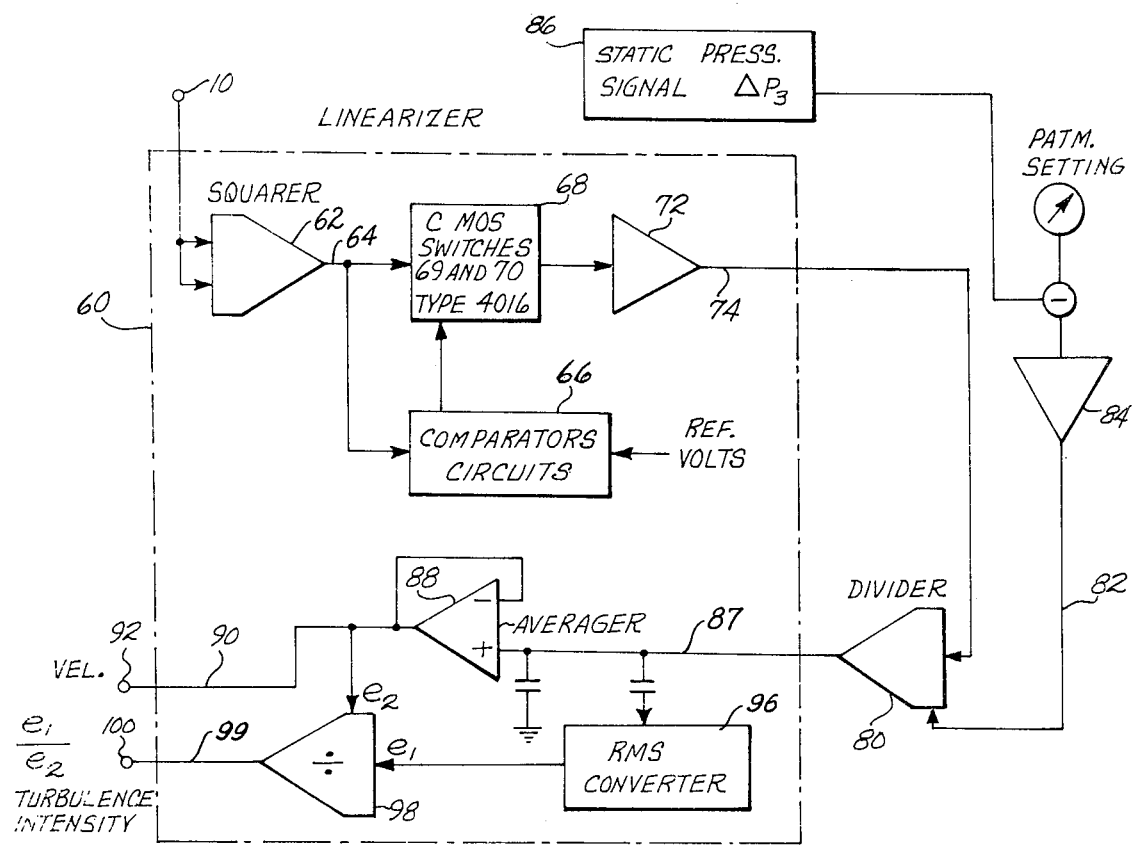
Figure 4:
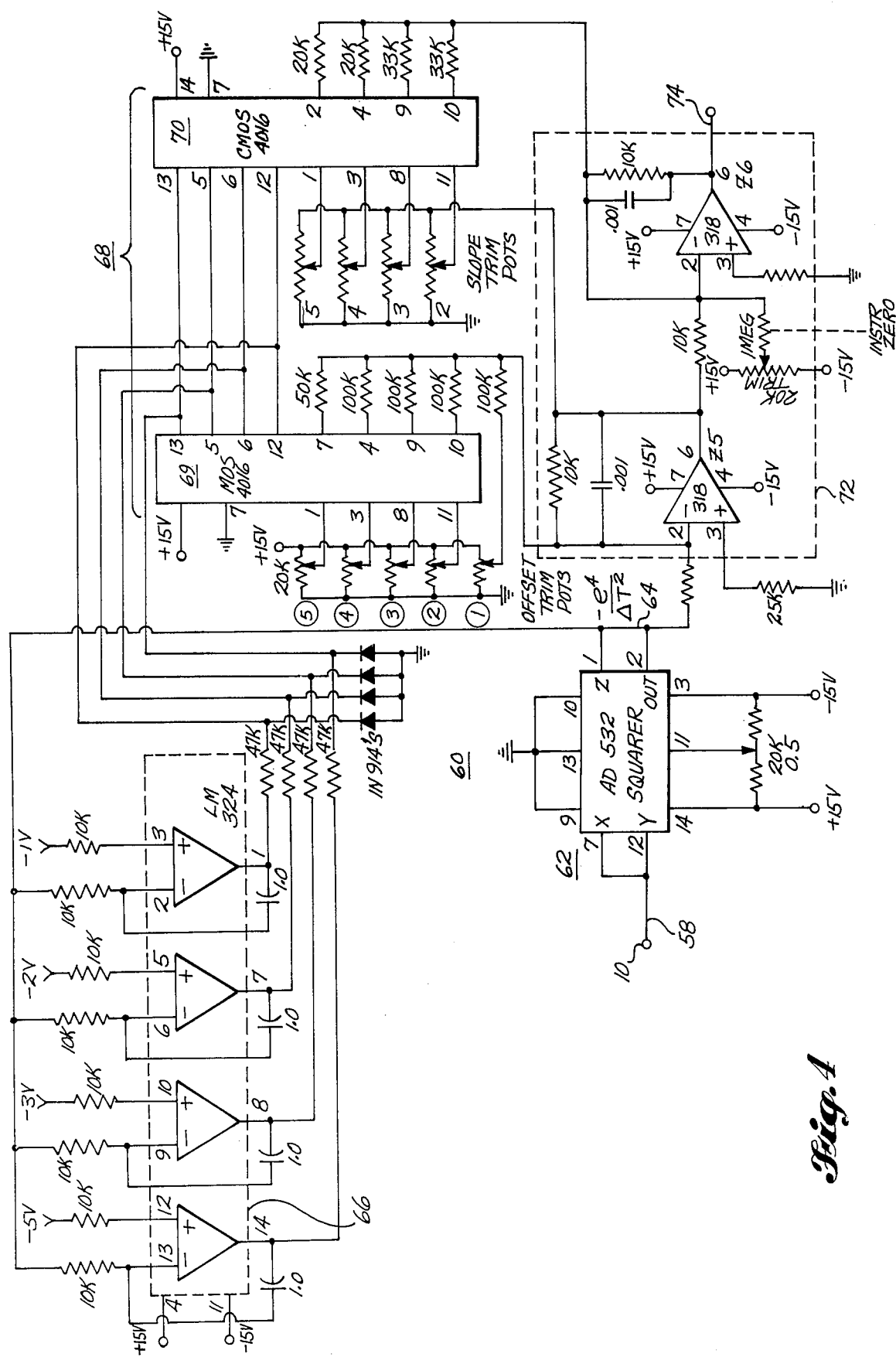

FIG. 1 is a signal flow diagram illustrative of signal processing in accordance with the present invention;

FIGS. 2 and 3 combined is a schematic and block diagram of the present anemometer signal processing system; and, FIG. 4 is a detailed schematic diagram of the linearizer circuit portion of the system shown in FIGS. 2 and 3.

Turning now to FIG. 1, it will become more readily understood how the present type signal processing in the anemometer compensator linearizer (ACL) system yields at the output a signal representative of fluid velocity utilizing King's Law for the hot wire anemometer, viz.:

The power dissipated by the hot probe, divided by the difference between the probe temperature and the fluid temperature, is a non-linear function of the fluid's mass flow. Stated mathematically:

$$P/\Delta T = A + B(\rho U)^n \text{ King's Law, where:}$$

$P$ = Power dissipated by the hot probe
$\Delta T$ = Probe temperature minus the fluid temperature
$\rho$ = Fluid density
$U$ = Fluid velocity
$n$ = Exponent (approximately 0.5) — it changes with fluid velocity and probes.
$A + B$ = Constants depending upon the probe and fluid.

In hot film or hot wire anemometry, a heated film or wire is utilized to measure the fluid velocity. The anemometer control box connects the probe in one arm of a bridge circuit and controls the bridge excitation to keep the probe at a constant temperature. The output signal from the anemometer control box is the bridge excitation voltage. The probes and anemometer control box are well known in the art and commercially available e.g., the anemometer control box utilized in the present system was a type Model 1050 manufactured by the Thermo System, Inc. company of St. Paul, Minn. The bridge excitation voltage from the anemometer control box is scaled to prevent overload and squared downstream as shown in FIG. 1 to provide an output signal which is proportional to the power dissipated by the hot film probe. A thermistor probe is mounted near the hot film probe, and constant current drive is provided to a log converter circuit which provides an output which is linear with fluid temperature. The film or wire probes operating temperature is fixed and computed by the operator from the over-heat resistance setting made on the aforementioned anemometer control box. Both probes are set to provide the same volts per degree temperature sensitivity. These outputs are summed, the results being the difference between the hot film probe's operating temperature and the fluid's temperature. The aforementioned output signal representative of power P is divided by the $\Delta T$ output in a divider circuit providing $P/\Delta T$ which is a non-linear function of the fluid's mass flow. A method of linearization described provides an output signal which is linear with mass flow.

The constant B in King's Law expressed earlier is determined by the probe's configuration, thermal conductivity, viscosity, and fluid density and are all temperature sensitive. These temperature effects combine to provide a constant B nearly independent of the fluid's temperature. The fluid's density varies with the ratio of its static pressure and absolute temperature. The term $B(\rho U)^n$ in King's Law actually reduces to $$(K(P_s U)^n)/T^{.07}$$

$K$ = constant
$P_s$ = fluid static pressure
$T$ = absolute temperature of the fluid Hence, the term can be simplified to: $B(\rho U)^n = K^1(P_s U)^n$ because $K/T^{.07}$ is almost independent of the fluid's temperature changes.

Thus, the signal output representative of mass flow from the linearizer when divided as shown in FIG. 1 by a signal representative of static pressure derived from a fluid static pressure probe yields a signal representative of instantaneous fluid velocity. Subsequent averaging (not shown in FIG. 1) yields a signal representative of the steady state velocity component. When the signal representative of instantaneous fluid velocity is coupled through an RMS converter as shown, a signal representative of turbulence RMS value is provided and when the latter signal is divided (not shown) by the aforementioned steady state value, a signal representative of turbulence intensity is provided.

Turning now to FIGS. 2 and 3 combined, a block diagram and schematic of an embodiment of circuitry implementing the signal processing of FIG. 1 will be seen wherein a bridge excitation voltage output signal 14 from anemometer control box 16 (which may be of the type 1050 by Thermo System, Inc. of St. Paul, Minn. is coupled to the input of amplifier 21. Amplifier 21 permits gain adjustment to prevent maximum input signal overload of the system downstream. Amplifier 21 output signal 23 is coupled to squaring circuit 26 which may be an integrated circuit multiplier type AD 532. Output signal 28 provides a signal representative of the term $(e^2)$, which is proportional to the power dissipated by the hot film probes. A thermistor probe 32 having a resistance 33 $(r_T)$ is mounted adjacent to the hot film probe. Thermistor resistance 33 provides the feedback resistor for operational amplifier 35 and therefore thermistor excitation is constant current, the current magnitude being determined by the resistor 36 (R). It should be recognized here that the resistance of a thermistor is an exponential function of its temperature. Correspondingly, the signal output 37 ($e = I r_T$) of amplifier 35 varies exponentially with the fluid temperature. Output signal 37 is coupled to the input of log converter circuit 42. Log converter circuit output signal 44 is linear with fluid temperature. At this point, pausing briefly in review it should be noted that the aforementioned features of signal processing provide a method of linearizing the output from a thermistor by utilizing log converter circuit means in combination in the signal flow path. Hot probe 17 operating temperature is fixed and computed by the operator from the over-heat resistance setting made on anemometer control box 16. Probe 17 temperature setting potentiometer 46 is set to the hereinbefore indicated computed probe temperature value and scaled to have the same volts per degree temperature sensitivity as the thermistor 32 temperature dependent output signal 44 from log converter circuit 42. Signal voltages 44 and 48 are coupled to summing amplifier circuit 50, the output signal 52 of summing amplifier 50 being a signal voltage representative of the difference between the hot probe 17 operating temperature and the fluid temperature. Output signal 28 from squaring circuit 26 which is proportional to the power dissipated by hot probe 17 is divided by difference signal 52 in divider circuit 56 to provide a signal 58 representative of $P/\Delta T$ which signal 58 is representative of a non-linear function of the fluid's mass flow. Signal 58 is coupled by direct conductive connection to terminal 10 of FIG. 3 which terminal 10 is the input terminal of linearizer circuit 60 shown in block form in FIG. 3 and by way of detailed schematic circuit diagram in FIG. 4. Proceeding now to a description of linearizer circuit 60 shown in FIG. 3, the same reference numerals will be utilized to further identify the corresponding portions of the circuit of FIG. 4 so that discussion will not have to be repeated thereto since this description is applicable to both FIGS. 3 and 4, and the detailed schematic of FIG. 4 being included for the purpose of providing an exemplary and detailed schematic embodiment of linearizer circuit 60 of FIG. 3.

Linearization of signal 58, at the output of divider circuit 56 of FIG. 2 (and present at terminal 10 of FIG. 3) could be readily accomplished by squaring signal 58 if the exponent $n$ of King's Law (given earlier in this description) were exactly 0.5. However, the output of squaring circuit 62 (shown herein as a type AD 532 circuit in FIG. 4, manufactured by Analog Devices company of Norwood, Mass.) is a signal 64 representative of $e^4/\Delta T^2$ which is nearly but not quite linear with mass flow. Further linearizing is done downstream in linearizer circuit 60 by straight line segment technique of signal processing. Comparator circuit means 66 utilizing four individual comparator circuits (as seen in detail in FIG. 4) are utilized to provide four break points. Each of the individual comparator circuits (shown herein as type LM 324N quad operational amplifier circuits of National Semiconductor Company of Santa Clara, California) of comparator circuit means 66 generates a logic 1 at its cross-over voltage. A logic 1 from an individual comparator circuit places the respective switch in type CMOS switching means 70 in a conducting (switch closed) state causing a respective "slope" setting potentiometer (slope trim pot as seen in FIG. 4) to be switched in, thereby changing the input that amplifier circuit means 72 receives from squaring circuit 62. At the same time further CMOS switching means 69 changes an "off-set" current input to amplifier circuit means 72. This combination of slope and off-set change is made four times so that the signal 74 from amplifier circuit 72 (denoted E in FIG. 4) is linear with mass flow.

The constant B in King's Law is determined by probe configuration, thermal conductivity of the fluid, and its viscosity. Thermal conductivity, viscosity, and fluid density are all temperature dependent, however it turns out that the combined effect will make the constant B nearly independent of the fluids temperature. The fluid's density varies with ratio of its static pressure and absolute temperature. Thus, output signal 74 representative of mass flow from amplifier circuit means 72 divided in divider circuit means 80 by a signal 82 representative of static pressure from amplifier circuit means 84 further developed upstream at 86 (as $\Delta P_s$ from a fluid static differential pressure transducer, note: $\Delta P_s = P_s - P_{atm}$) results in a signal 87 representative of instantaneous linearized fluid velocity. Patm setting provides a level set which is the barometric pressure. Signal 87 representative of instantaneous linearized fluid velocity is averaged by averaging circuit means 88 to provide a signal at output terminal 92 representative of the steady state velocity component (denoted VEL in FIG. 3) of the fluid. Signal 87 is also coupled to RMS converter circuit 96 to provide a signal $e_1$ representative of turbulence steady state value which signal $e_1$ is divided by divider circuit means 98 by $e_2$, the resulting signal 99 being representative of the fluid turbulence intensity at second output terminal 100.

I claim:

1. A system for providing an output signal which is substantially linear with fluid temperature comprising:

operational amplifier circuit means having an output terminal;

a thermistor probe having a resistance which is an exponential function of fluid temperature; said thermistor resistance connected in feedback path with said operational amplifier circuit means;

log converter circuit means coupled to said output terminal of said operational amplifier circuit means for providing said output signal which is substantially linear with fluid temperature;

a hot probe temperature setting potentiometer having a volts-per-degree temperature sensitivity equal to the volts-per-degree temperature sensitivity of said output signal; and, summing amplifier circuit means responsive to said output signal and connected to said probe temperature setting potentiometer for providing a signal voltage representative of the difference between hot probe operating temperature and the fluid temperature.

* * * * *